United States Patent
Moriguchi et al.

(10) Patent No.: US 10,409,660 B2
(45) Date of Patent: Sep. 10, 2019

(54) STORAGE SYSTEM AND CONTROL METHOD THEREFOR

(71) Applicant: HITACHI, LTD., Tokyo (JP)

(72) Inventors: Mioko Moriguchi, Tokyo (JP); Etsutaro Akagawa, Tokyo (JP)

(73) Assignee: HITACHI LTD., Tokyo (JP)

( * ) Notice: Subject to any disclaimer, the term of this patent is extended or adjusted under 35 U.S.C. 154(b) by 142 days.

(21) Appl. No.: 15/554,307

(22) PCT Filed: Jun. 5, 2015

(86) PCT No.: PCT/JP2015/066331
§ 371 (c)(1),
(2) Date: Aug. 29, 2017

(87) PCT Pub. No.: WO2016/194222
PCT Pub. Date: Dec. 8, 2016

(65) Prior Publication Data
US 2018/0052730 A1  Feb. 22, 2018

(51) Int. Cl.
*G06F 11/00* (2006.01)
*G06F 11/07* (2006.01)
*G06F 13/10* (2006.01)
*G06F 12/14* (2006.01)
*G06F 11/27* (2006.01)

(52) U.S. Cl.
CPC ...... *G06F 11/0727* (2013.01); *G06F 11/0751* (2013.01); *G06F 12/1408* (2013.01); *G06F 13/10* (2013.01); *G06F 11/0793* (2013.01); *G06F 11/27* (2013.01); *G06F 2212/1052* (2013.01); *G06F 2212/402* (2013.01)

(58) Field of Classification Search
CPC ............. G06F 11/0727; G06F 11/0793; G06F 11/0751; G06F 11/2215; G06F 11/27; G06F 12/1408
See application file for complete search history.

(56) References Cited

U.S. PATENT DOCUMENTS

| 7,372,962 | B2 * | 5/2008 | Fujimoto | G06F 21/606 380/255 |
| 2006/0048018 | A1 * | 3/2006 | Hosoya | G06F 11/0727 714/48 |

(Continued)

FOREIGN PATENT DOCUMENTS

| JP | 2006-260491 A | 9/2006 |
| JP | 2009-105644 A | 5/2009 |
| JP | 2009-187483 A | 8/2009 |

OTHER PUBLICATIONS

International Search Report for WO 2016/194222 A1, dated Aug. 11, 2015.

*Primary Examiner* — Michael Maskulinski
(74) *Attorney, Agent, or Firm* — Volpe and Koenig, P.C.

(57) ABSTRACT

This storage system has a plurality of modules that encode data being written to a storage medium and decode data being read from said storage medium. The storage system also has an adapter that controls the reading and writing of data from and to the storage medium such that, when an error is detected and determined to be the error of at least one of said plurality of modules, the adapter prevents the module (s) in question from being used to read or write data.

9 Claims, 5 Drawing Sheets

(56) References Cited

U.S. PATENT DOCUMENTS

| | | | |
|---|---|---|---|
| 2006/0259786 A1* | 11/2006 | Mizuno | G06F 21/78 |
| | | | 713/193 |
| 2007/0271481 A1* | 11/2007 | Kawakami | G06F 11/0727 |
| | | | 714/5.11 |
| 2009/0204743 A1 | 8/2009 | Inoue et al. | |
| 2011/0320706 A1* | 12/2011 | Nakajima | G06F 11/0727 |
| | | | 711/114 |
| 2015/0169902 A1* | 6/2015 | Camp | H04L 9/0631 |
| | | | 713/193 |
| 2016/0124826 A1* | 5/2016 | Sugahara | G06F 11/27 |
| | | | 714/30 |

* cited by examiner

| BEPK ID | BEPK STATUS | BE IF ID | BE IF STATUS | ENC/DEC STATUS | DRIVE ID | DRIVE STATUS | PATH STATUS |
|---|---|---|---|---|---|---|---|
| 00 | NORMAL | BEIF 0 | NORMAL | NORMAL | D_1 | NORMAL | ENABLE |
| | | BEIF 1 | NORMAL | NORMAL | D_2 | NORMAL | ENABLE |
| | | BEIF 2 | NORMAL | NORMAL | D_3 | NORMAL | ENABLE |
| | | BEIF 3 | NORMAL | NORMAL | D_4 | NORMAL | ENABLE |
| 01 | NORMAL | | | ERROR | D_1 | NORMAL | DISABLE |
| | | | | ERROR | D_2 | NORMAL | DISABLE |
| | | | | NORMAL | D_3 | NORMAL | DISABLE |
| | | | | NORMAL | D_4 | NORMAL | DISABLE |
| 02 | NORMAL | BEIF 4 | NORMAL | NORMAL | D_5 | ERROR | DISABLE |
| | | BEIF 5 | ERROR | NORMAL | D_6 | NORMAL | ENABLE |
| | | | | NORMAL | D_7 | NORMAL | DISABLE |
| | | | | NORMAL | D_8 | NORMAL | DISABLE |
| 03 | NORMAL | BEIF 6 | NORMAL | NORMAL | D_5 | ERROR | DISABLE |
| | | BEIF 7 | NORMAL | NORMAL | D_6 | NORMAL | ENABLE |
| | | | | NORMAL | D_7 | NORMAL | ENABLE |
| | | | | NORMAL | D_8 | NORMAL | ENABLE |
| ... | | | | | | | |

1051

Columns: 10511, 10512, 10513, 10514, 10515, 10516, 10517, 10518

STORAGE SYSTEM AND CONTROL METHOD THEREFOR

TECHNICAL FIELD

The present invention relates to a storage system and a control method therefore.

BACKGROUND ART

A storage system has a large number of storage drives (e.g., HDDs: Hard Disk Drives) in which a lot of information is stored and is accessed from a lot of host computers via a network. Hence, the reliability of a storage system to allow the system to continue to operate in case a fault should occur in the storage system is important. Additionally, security to prevent information leakage is also important.

As regards the reliability of a storage system, Patent Literature 1 discloses a technical approach in which, upon detecting a fault occurring, a faulty portion in connection paths is located and a configuration of connections of a switching device is changed to bypass the faulty portion. Also, as regards security of information, it is commonly used to encrypt information to be stored.

CITATION LIST

Patent Literature

Patent Literature 1: Japanese Patent Application Publication No. 2009-187483

SUMMARY OF INVENTION

Technical Problem

The technical approach disclosed in Patent Literature 1 enables a storage system to continue its operation by bypassing a fault portion. However, a technical contrivance in terms of control, taking account of a range of influence of a fault, is not disclosed, and no technical contrivance is found, especially, in terms of control adaptable for a range of influence based on characteristics of an encryption/decryption module.

Therefore, an object of the present invention resides in implementing control adaptable for a range of influence of a portion where a fault occurs in a storage system.

Solution to Problem

A representative storage system pertaining to the present invention is characterized by comprising a plurality of modules that encrypt data to write to a storage medium and decrypt data read from the storage medium and an adapter that controls reading and writing of data from/to the storage medium such that, upon detecting a fault and if having determined that the fault lies in at least one of the plurality of modules, the adapter sets it disabled to read and write data using every one of the plurality of modules.

Advantageous Effects of Invention

According to the present invention, it would become possible to implement control adaptable for a range of influence of a portion where a fault occurs in a storage system.

DESCRIPTION OF EMBODIMENTS

In the following, respective embodiments will be described with reference to the drawings. For clarifying description, details are elided, where appropriate, in the following description and in the drawings and a duplicated description is omitted as necessary. In the following description, information is explained using a term "table", but such information is not necessarily limited to a table data structure and may be represented by a data structure such as a list.

Also, in the following description, sentences in which the subject is a "program" are sometimes written for explanation; the subject may be a processor instead of a program, since a program is executed by a processor to perform predefined processing tasks, using a memory and a communication port. Some or all of processing tasks of a processor executing a program may be implemented by dedicated hardware.

In addition, diverse programs may be installed in each system via a program distribution server or a storage medium which is readable by a computer.

FIRST EMBODIMENT

Figure 1:
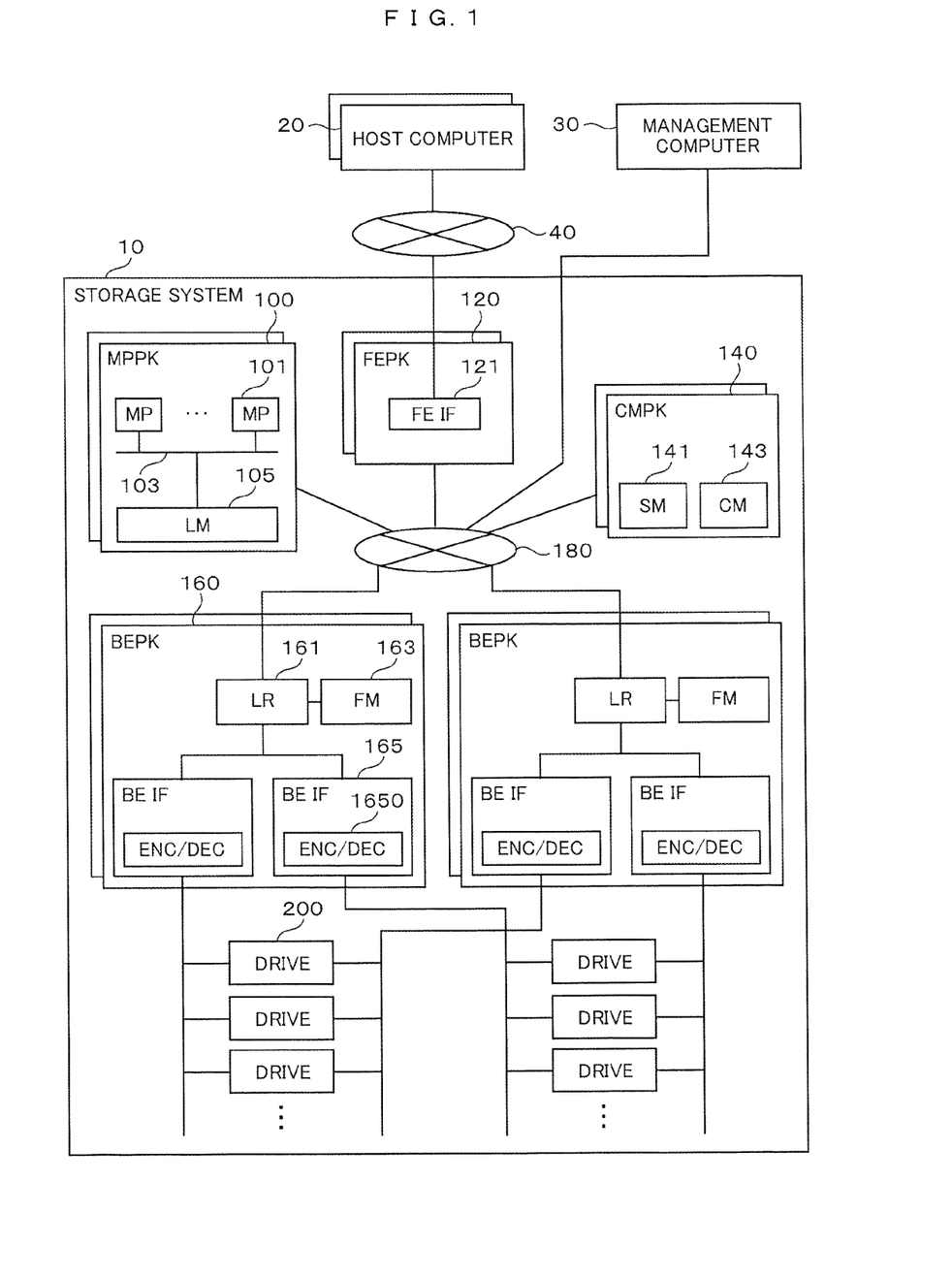
FIG. 1 A diagram depicting an example of an overall aspect of a computer system.

A first embodiment is concretely described below with reference to FIGS. 1 to 5. FIG. 1 is a diagram depicting an example of a computer system including a storage system 10, a host computer 20 which carries out data processing and arithmetic operation, and a management computer 30 which manages the storage system 10. The computer system can include plural host computers 20.

The storage system 10 and the host computer(s) 20 are interconnected via a data network 40. The data network 40 is, for example, SAN (Storage Area Network) and may be IP (Internet Protocol) network or any other type of network for data communication. The host computer(s) 20 issues I/O requests (primarily, data read/write requests) to the storage system 10 via the data network 40.

The storage system 10, the host computer(s) 20, and the management computer 30 are interconnected via a management network (not depicted). The management network is, for example, IP network and may be SAN or any other type of network. The data network 40 and the management network may be the same network.

The storage system 10 accommodates plural storage drives 200. Each storage drive 200 may be a Hard Disk drive (HDD) having a nonvolatile magnetic disk 200 or a Solid State Drive (SSD) including a nonvolatile semiconductor memory (e.g., a flash memory). Each storage drive 200 stores data (user data) transmitted from the host computer 20. The plural storage drives 200 provide data redundancy through RAID (Redundant Arrays of Inexpensive Disks), thereby enabling it to prevent data from being lost in case a fault should occur in one storage drive 200.

The storage system 10 includes a front-end package (FEPK) 120 for making a connection to a host computer 20, a back-end package (BEPK) 160 for making a connection to a storage drive 200, a cache memory package (CMPK) 140 equipped with a cache memory 143, a microprocessor package (MPPK) 100 equipped with a microprocessor 101 for internal processing, and an internal network 180 connecting these packages.

As depicted in FIG. 1, the storage system 10 includes plural FEPKs 120, plural BEPKs 160, plural CMPKs 140, and plural MPPKs 100.

Each FEPK 120 has a front-end interface (FE IF) 121 for making a connection to a host computer 20. The FE IF 121 can include plural ports and each port can connect to a host computer. The FE IF 121 converts a protocol, e.g., Fibre Channel Over Ethernet (a registered trademark) (FCoE) which is used for communication between a host computer 20 and the storage system 10 to a protocol, e.g., PCI-Express (a registered trademark) which is used in the internal network 180.

Each BEPK 160 has a back-end interface (BE IF) 165 for making a connection to a storage drive 200, a local router (LR) 161 which controls data transfer within the storage system 10, and a flash memory (FM) 163 which stores a program for the LR 161. The BE IF 165 can include plural ports and each port can connect to a storage drive 200.

Each BE IF 165 connects to a different storage drive 200 and one storage drive 200 connects to two or more BE IFs 165 included in a BE PK 160, so that redundant transfer paths are formed. Each BE IF 165 also has an encryption/decryption module 1650 (which may be referred to as ENC/DEC) for encrypting data to be stored to a storage drive 200 and decrypting data read from the storage drive 200.

Each CMPK 140 has a cache memory (CM) 143 which temporarily stores user data to read or write from a host computer 20 and a shared memory (SM) 141 which stores control information required by one or plural MPPKs 100. Plural MPPKs 100 (microprocessors thereof) to handle different volumes can access the SM 141. Data and a program which are accessed by the MPPKs 100 are loaded to the SM 141 from a nonvolatile memory (not depicted) or a storage drive 200 within the storage system 10. The CM 143 and SM 141 associated in the same CMPK 140 in FIG. 1 may be installed on separate boards (in packages).

Each MPPK 100 has one or more microprocessors (MP) 101, a local memory (LM) 105, and a bus 103 connecting them. Although plural MPs 101 are installed in an example depicted in FIG. 1, the number of MPs 101 may be one. Plural MPs 101 may constitute a single processor virtually. The LM 105 stores a program which each MP 101 executes and control information which each MP 101 uses.

Figure 2:
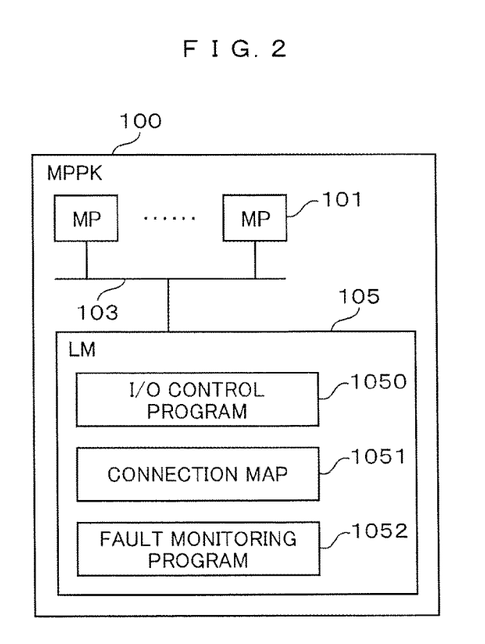
FIG. 2 A diagram depicting an example of information which is stored in a local memory in a storage system.

FIG. 2 is a diagram depicting an example of information which is stored in the LM 105 within an MPPK 100. An I/O control program 1050 is executed by an MP 101 and controls whether to communicate data through a path passing through what BEPK 160 and what BE IF 165 using information of a connection map 1051, when writing to a storage drive 200 or reading from the storage drive 200 is performed. Particularly, control is performed to bypass a path set disabled for use in the connection map 1051.

Also, a fault monitoring program 1052 is executed by an MP 101 and monitors status of each BEPK 160 and detects a fault occurring or updates the connection map 1051 upon receiving a notification of fault information on a BE IF 165 among others from a BEPK 160.

An example of the connection map 1051 will be explained later with FIG. 4. The connection map may include connection relations among a BEPK 160, a BE IF 165, an encryption/decryption module 1650, and a drive 200, in addition to information which is subject to update by the fault monitoring program 1052.

And now, an MP 101 which executes the I/O control program 1050 may be regarded as an I/O control unit and an MP 101 which executes the fault monitoring program 1052 may be regarded as a fault monitoring unit. Also, an MPPK 100 may be regarded as a controller of the storage system 10.

Figure 3:
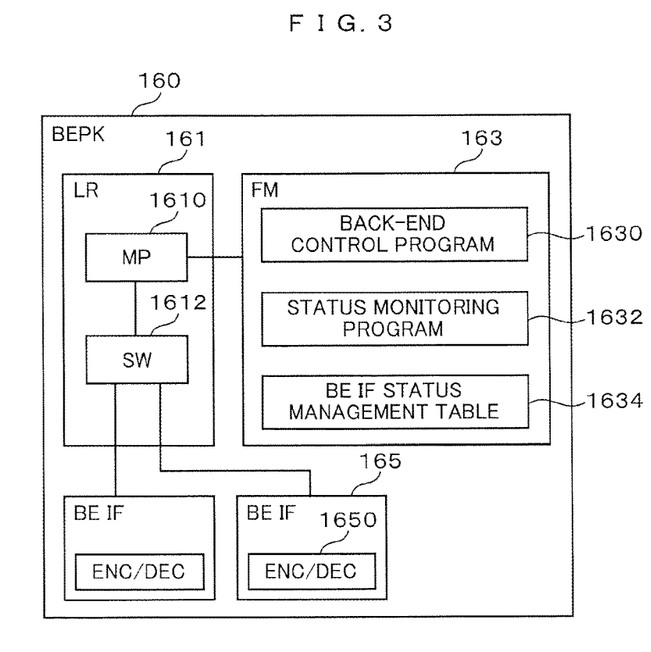
FIG. 3 A diagram depicting an example of information which is stored in a flash memory in the storage system.

FIG. 3 is a diagram depicting an example of a BEPK 160. The LR 161 has an MP 1610 and a switch (SW) 1612. A back-end control program 1630 is executed by the MP 1610 and assigns an I/O request sent from an MPPK 100 to a BE IF 165 by controlling the switch 1612 according to a path specified and returns a result of processing to the MPPK 100.

A status monitoring program 1632 is executed by the MP 1610 and monitors the status of respective components such as BE IFs 165 within the BEPK 160 and detects a fault occurring. If a portion where a fault occurs is an encryption/decryption module 1650, this program 1632 notifies the back-end control program 1630 and the fault monitoring program 1052 in the MPPK 100. Upon receiving the notification of a fault occurring in the encryption/decryption module 1650 from the status monitoring program 1632, the back-end control program 1630 blocks the BEPK 160 and rejects accepting all I/O requests to the BEPK 160.

Processing as above will be explained later, inter alia, with FIG. 5. And now, the MP 1610 which executes the back-end control program 1630 may be regarded as a back-end control unit and the MP 1610 which executes the status monitoring program 1632 may be regarded as a status monitoring unit. In addition, the BEPK 160 may be regarded as an adapter to storage drives 200. A BE IF status management table 1634 will be explained in a second embodiment.

Figure 4:
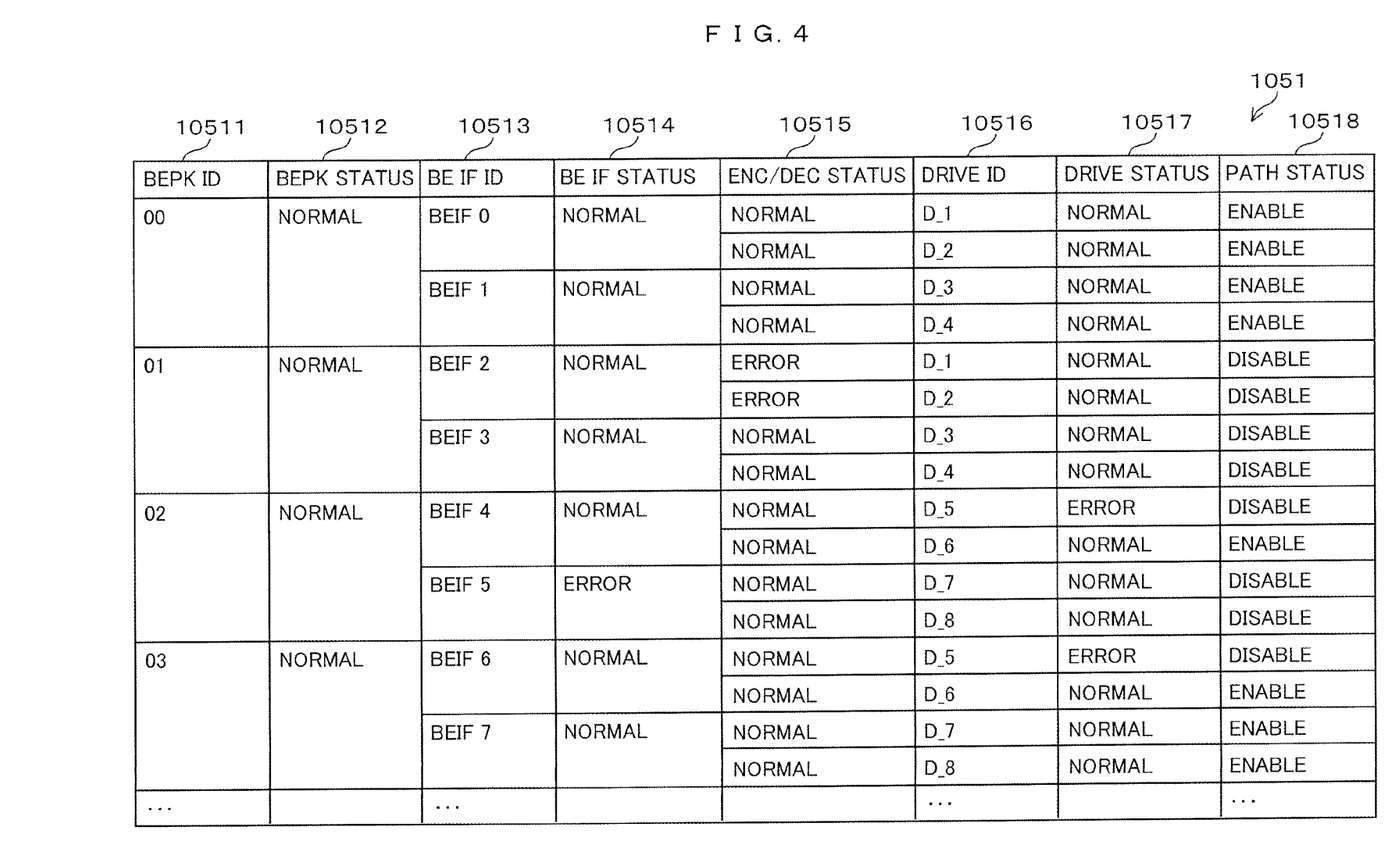
FIG. 4 A diagram representing an example of a connection map.

FIG. 4 is a diagram representing an example of a connection map 1051. The connection map 1051 includes a BEPK ID field 10511 in which an ID to uniquely identify a BEPK 160 in the storage system 10 is specified, a BEPK status field 10512 in which the status of a BEPK 60 whose ID is specified in the BEPK. ID field 10511 is specified, a BE IF ID field 10513 in which an ID which can uniquely identify a BE IF 165 within a BEPK 160 in the storage system 10 is specified, and a BE IF status field 10514 in which the status of a BE IF 165 whose ID is specified in the BE IF ID field 10513 is specified.

The connection map 1051 also includes an ENC/DEC status field 10515 in which the status of an encryption/decryption module 1650 mounted in an BE IF 165 whose ID is specified in the BE IF ID field 10513 is specified, a drive ID field 10516 in which an ID which can uniquely identify a storage drive 200 installed in the storage system 10 is specified, and a drive status field 10517 in which the status of a storage drive 200 whose ID is specified in the drive ID field 10516 is specified.

The connection map 1051 further includes a path status field 10518 in which it is specified whether a path to a storage drive 200 which is specified in the drive ID field 10516 is enabled or disabled for use. This path is a path passing through a BE IF 165 whose ID is specified in the BE IF ID field 10513, mounted in a BEPK 160 whose ID is specified in the BEPK ID field 10511, and terminating at a storage drive 200 which is specified in the drive ID field 10516. The path status field 10518 is filled with "ENABLE" for a path which is enabled for use and "DISABLE" for a path which is disabled for use.

Here, IDs in each of BEPK ID field 10511, BE IF ID field 10513, and drive ID field 10516 may be preset by the management computer 30 or an input device omitted from depiction according to connection relations and mounting relations among a BEPK 160, a BE IF 165, an encryption/decryption module 1650, and a drive 200 which constitute a path.

As in an example represented in FIG. 4, drives 200 labeled "D_1" to "D_4" in the drive ID field 10516 each may have two paths, one passing through a BEPK 160 labeled "00" in the BEPK ID field 10511 and the other passing through a BEPK 160 labeled "01".

Each of the BEPK status field 10512, BE IF status field 10514, ENC/DEC status field 10515, and drive status field 10517 is filled with "ERROR" upon the detection of a fault occurring in a BEPK 160, a BE IF 165, an encryption/decryption module 1650, and a storage drive 200 which are designated by each ID in each ID field and is filled with "NORMAL" as long as such fault occurring is not detected.

In addition, because a BEPK 160, a BE IF 165, an encryption/decryption module 1650, and a storage drive 200 each constitute a part of a path explained with regard to the path status field 10518, the path status field 10518 is filled with "DISABLE" for a path within a range of influence according to what portion is faulty, indicated by its status field filled with "ERROR".

In the example represented in FIG. 4, a fault of a BE IF 165 which is mounted in a BEPK 160 is not reckoned as a fault of the BEPK 160 and a fault of an encryption/decryption module 1650 which is mounted in a BE IF 165 is not reckoned as a fault of the BE IF 165. That is, a fault of a BE IF 165 is a fault in a portion other than the encryption/decryption module 1650 included in the BE IF 165.

Hence, "ERROR" is present in the ENC/DEC status field 10515 of an encryption/decryption module 1650 mounted in a BE IF 165 labeled "BEIF 2" in the BE IF ID field 10513 associated with "01" in the BEPK ID field 10512, whereas "NORMAL" is present in the BE IF status field 10514 of the BE IF 165 in which the encryption/decryption module 1650 is mounted.

In the example of FIG. 4, as each path within a range of influence in response to the status of each portion, in a case where a fault lies in the encryption/decryption module 1650 mounted in the "BE IF2" in the BE IF ID field 10513 (with "ERROR" present in the ENC/DEC status field 10515), all paths passing through the BEPK 160 labeled "01" in the BEPK ID field 10511, including the faulty encryption/decryption module 1650, are set disabled for use and "DISABLE" is present in the path status field 10518 for those paths.

In a case where a fault lies in a drive 200 labeled "D_5" in the drive ID field 10516 (with "ERROR" present in the drive status 10517), a path passing through a BE IF 165 labeled "BE IF 4" in the BE IF ID field 01513 and terminating at the faulty drive 200 and a path passing through a BEIF 165 labeled "BE IF6" and terminating at the faulty drive 200 are set disabled for use by the BE IF ID field 10513 and "DISABLE" is present in the path status field 10518.

In a case where a fault lies in a BE IF 165 labeled "BE IF5" in the BE IF ID field 10513 (with "ERROR" present in the BE IF status field 01514), all paths passing though the faulty BE IF 165 are set disabled for use and "DISABLE" is present in the path status field 10518.

Figure 5:
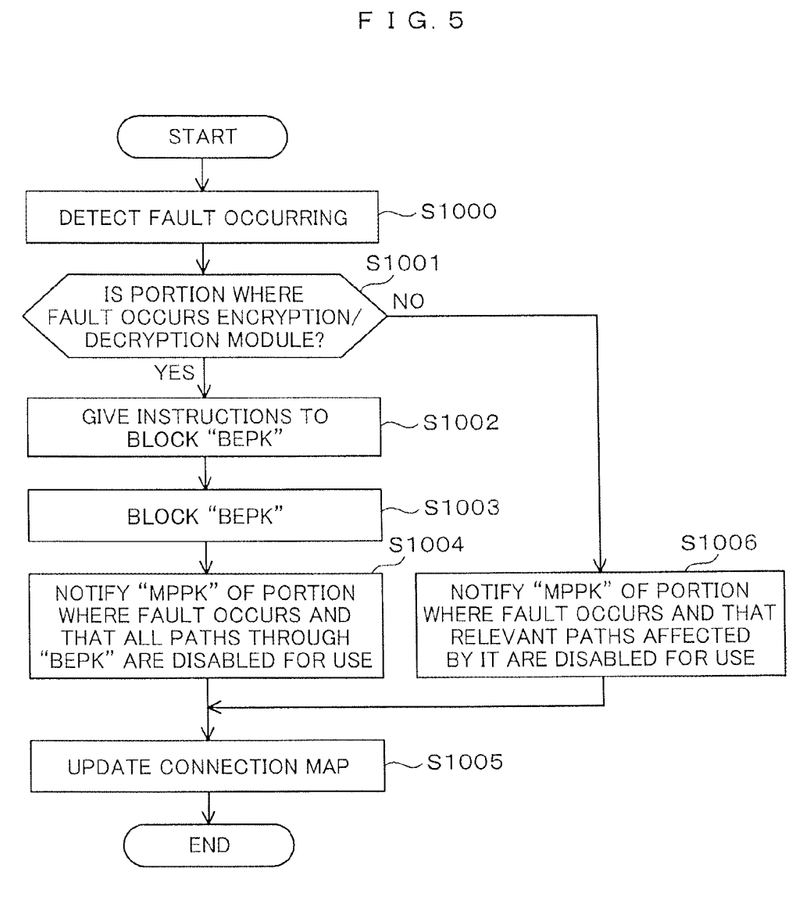
FIG. 5 A flowchart illustrating an example of fault control based on fault detection.

Operation of the storage system 10 is described with FIG. 5. FIG. 5 is a flowchart illustrating an example of fault control in which each portion and path status are set by an LR 161 in a BEPK 160 and an MP 101 in an MPPK 100. When the status monitoring program 1632 in the BEPK 160 detects a fault occurring in the BEPK 160 and a storage drive 200 (S1000), it determines whether a portion where the fault occurs is an encryption/decryption module 1650 (S1001). And now, if a portion where the fault occurs can be identified by detecting the fault occurring, S1000 and S1001 may not need to be separate steps.

If the status monitoring program 1632 has determined at S1001 that the portion where the fault occurs is not the encryption/decryption module 1650, the status monitoring program 1632 notifies the MPPK 100 of a portion where the fault occurs among the BEPK 160, BE IFs 165, and storage drives 200 and that relevant paths within a range of influence of the portion where the fault occurs should be disabled for use (S1006). Here, the relevant paths within a range of influence of the portion where the fault occurs may be taken as paths passing though the portion where the fault occurs. Additionally, if a storage drive 200 is the portion where the fault occurs, those paths may be all paths terminating at the storage drive 200 which is the portion where the fault occurs.

Otherwise, if the status monitoring program 1632 has determined at S1001 that the portion where the fault occurs is the encryption/decryption module 1650, the status monitoring program 1632 notifies the back-end control program 1630 that the fault occurs, so the BEPK 160 should be blocked (S1002). The back-end control program 1630 thus notified blocks the BEPK 160 to put the BEPK into a state where it does not accept any I/O requests from the MPPK 100 (S1003).

The status monitoring program 1632 then notifies the MPPK 100 that the encryption/decryption module 1650 is faulty as the portion where the fault occurs and all paths through the BEPK 160 are disabled for use (S1004).

When the fault monitoring program 1052 in the MPPK 100 receives from the BEPK 160 a notification of the portion where the fault occurs and the paths disabled for use, it updates the connection map 1051 by the received information (S1005). That is, the fault monitoring program 1052 sets "ERROR" in the BEPK status field 10512, BE IF status field 10514, ENC/DEC status field 10515, and drive status field 10517 according to the notified portion where the fault occurs and sets "DISABLE" in the path status field 10517 according to the notified paths disabled for use.

Separately from the processing described above, the I/O control program 1050 in the MPPK 100 refers to the path status field 10518 in the connection map 1051 and instructs the BEPK 160 to access a storage drive 200 using a path for which "ENABLE" is present in the path status field 10518.

For instance, because "DISABLE" is present in the path status field 10518 for all paths through a BEPK 160 labeled "01" in the BEPK ID field 10511, the I/O control program 1050 controls BEPKs 160 to ban the use of the BEPK 160 labeled "01" in the BEPK ID field 10511 and to use a BEPK 160 labeled "00" in the BEPK ID field 10511 and with the same IDs present in the drive ID field 10516.

As described in the foregoing, in a case where a fault occurring in an encryption/decryption module 1650 has been detected, because there is a possibility that a problem also lies in another encryption/decryption module 1650 mounted in the same BEPK 160, paths are to be disabled for use on a per BEPK 160 level. In a case where a fault occurring in a portion other than an encryption/decryption module 1650 has been detected, paths passing through the portion where the fault occurs are to be disabled for use. Also, upon the detection of a fault occurring in an encryption/decryption module 1650, the BEPK 160 is blocked and erroneous encryption of data to write from the MPPK 100 does not take place. It is thus enabled to take countermeasures against a fault specific to encryption/decryption modules 1650.

SECOND EMBODIMENT

A storage system which is described in a second embodiment is configured such that self-tests are performed within a BEPK 160 and a BE IF status management table 1634 is used which was presented in an example of a FM 163 in a BEPK 160 in FIG. 3 and descriptions of the same components as for the first embodiment are dispensed with.

The second embodiment includes processing to enable a part of the BEPK 160 for use according to self-tests, whereas, in the first embodiment, when a fault occurring in an encryption/decryption module 1650 has been detected, all paths through the BEPK 160 are to be disabled for use, based on characteristics of encryption/decryption modules 1650.

Figure 6:
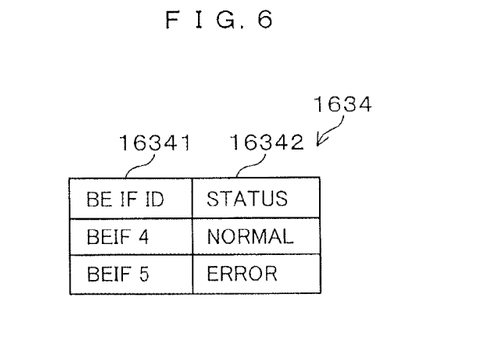
FIG. 6 A diagram representing an example of a BE IF status management table.

FIG. 6 is a diagram representing an example of the BE IF status management table 1634. The BE IF status management table 1634 is information regarding BE IFs 165 in a BEPK 160 in which the BE IF status management table 1634 is stored and is comprised of a BE IF ID field 16341 for an ID which can uniquely identify a BE IF 165 and a status field 16342 in which the status of an BE IF 165 is specified.

The status field 16342 is filled with the same information as the status of a BE IF 165 detected by the status monitoring program 1632 and notified to the MPPK 100. For example, this field is filled with "ERROR" in a case where a fault occurring in a BE IF 165 has been detected.

Figure 7:
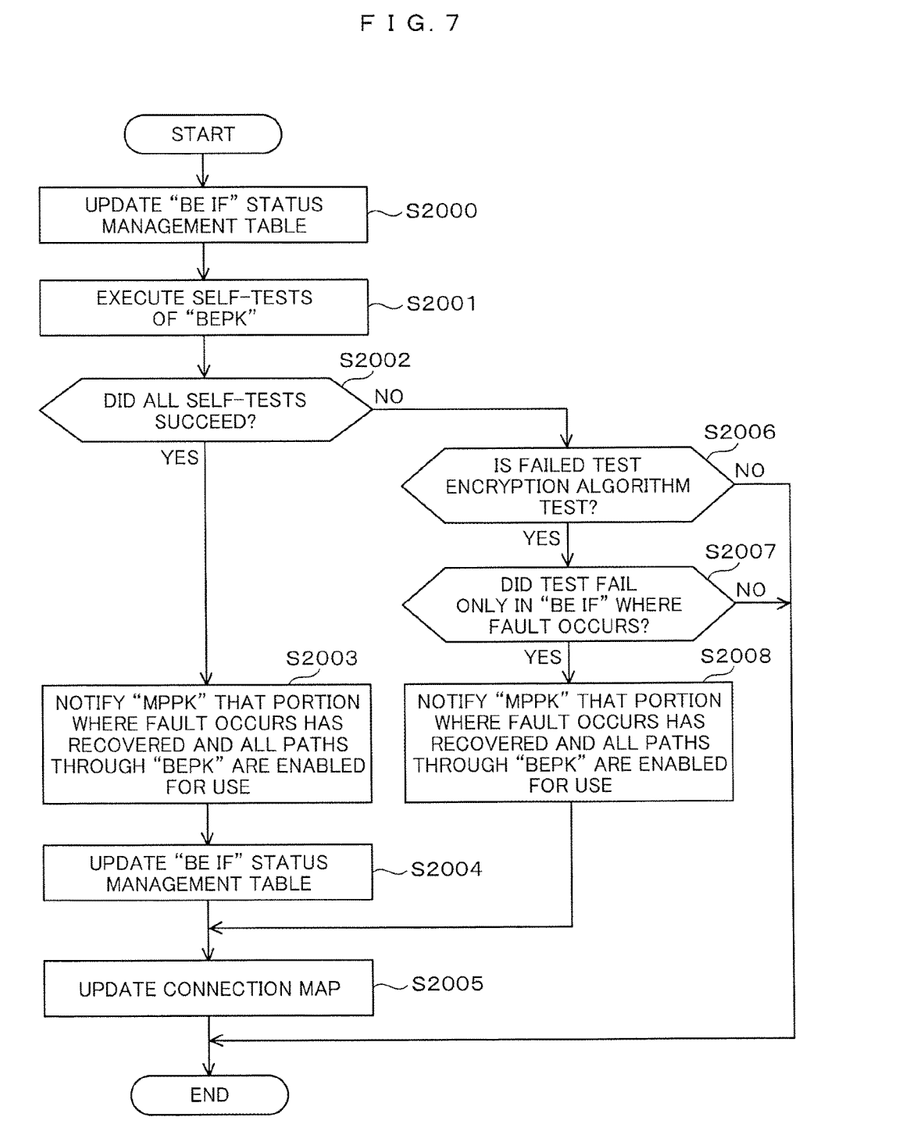
FIG. 7 A flowchart illustrating an example of fault control based on self-tests.

Operation of the storage system 10 is described with FIG. 7. FIG. 7 is a flowchart illustrating an example of fault control in which each portion and path status are updated. Following S1005 presented in FIG. 5, processing starts according to the flowchart from S2000 illustrated in FIG. 7. First, the back-end control program 1630 updates the BE IF status management table 1634 (S2000).

More specifically, the back-end program 1630 fills "ERROR" in the status field 16342 for an BE IF165 in which a fault occurs, indicated by a notification of a fault occurrence from the status monitoring program 1632. Here, the notification of a fault occurrence from the status monitoring program 1632 is the same as described for S1004 or S1006 using FIG. 5. Instead of S2000, at S1004 or S1006, the back-end control program may also receive the notification of a fault occurrence and update the BE IF status management table 1641.

Then, the back-end control program 1630 starts up self-tests of the BEPK 160 (S2001). Here, before the start-up of self-tests, portions which are subjected to the self-tests may be reset. The self-tests may include programs of an integrity test using MAC (Message Authentication Code) or HMAC (Hashed Message Authentication Code) to, for instance, verify that software or firmware is not corrupted or altered or a known answer test to verity that encryption algorithm operates properly.

In a known answer test, verification or the like may be made by storing in advance data to be encrypted in a given manner and encrypted data by encrypting the data to be encrypted as a known answer, actually inputting the data thus stored to an encryption/decryption module, and comparing its output data with the data thus stored.

Like this, the self-tests may check the integrity of a program itself or may be a check using data for the test, whereas a way of detecting a fault occurrence at S1000 is to check for actual data or the like and is a parity check or the like of a memory element for temporary storage or a path in the course of processing.

The status monitoring program 1632 determines results of the self-tests (S2002); if it has determined that all the self-tests succeeded, it notifies the MPPK 100 that a portion where a fault occurs in the BEPK 160 has recovered and all paths are enabled for use (S2003). Also, the back-end control program 1630 updates the status 16342 from "ERROR" to "NORMAL" in the BE IF status management table 1634 (S2004). And now, the update at S2004 may be dispensed with by always executing S2000 and making the update before referring to the BE IF status management table 1634.

If having determined that there is a failed self-test at S2002, the status monitoring program 1632 determines whether or not the failed self-test is an encryption algorithm test (S2006). If having determined that the failed test is an encryption algorithm test, the status monitoring program 1632 refers to the BE IF status management table 1634 and determines whether or not "ERROR" is present in the status field 16342 for the BE IF 165 in which an encryption/decryption module 1650 for which the self-test failed is mounted (S2007).

If having determined that "ERROR" is contained in the status field 16342 for the BE IF 165 in which an encryption/decryption module 1650 for which the self-test failed is mounted, the status monitoring program 1632 notifies the MPPK 100 that paths passing through a BE IF 165 where no fault occurs are enabled for use (S2008).

Alternatively, if the status monitoring program 1632 has determined at S2007 that the self-test of the encryption/decryption module 1650 succeeded only in a BE IF 165 where no fault occurs, the status monitoring program 1632 may notify the MPPK 100 at S2008 that paths passing through the BE IF 165 where no fault occurs are enabled for use.

The fault monitoring program 1052 in the MPPK 100 updates the connection map 1051 according to a notification from the status monitoring program 1632 of the BEPK 160 at S2003 or S2002 (S2005) and terminates the processing.

If it has been determined that the failed self-test is not an encryption algorithm test (NO as determined at S2006), and if it has been determined that the self-test of an encryption/decryption module 1650 failed even in a BE IF 165 where no fault occurs (NO as determined at S2007), the connection map 1051 is not updated and then the processing is terminated.

Although the back-end control program 1630 in the BEPK 160 starts up the self-tests in the foregoing description, the fault monitoring program 1052 in the MPPK 100 may start up the self-tests. In this case, S2000 presented in FIG. 7 may be executed following S1003 presented in FIG. 5. At S2001 presented in FIG. 7, the fault monitoring program 1052 may carry out start-up processing of the self-tests of the BEPK 160, following that the I/O control program 1050 in the MPPK 100 notifies the fault monitoring program 1052 that a fault has occurred in the BEPK 160 after the update of the connection map 1051 at S1005 presented in FIG. 5.

As described in the foregoing, even when paths have once been set disabled upon detection of a fault occurrence, paths can be enabled for use if their proper operation can be verified by self-tests. Thereby, it is possible to enable paths for use in a case where a fault is transient or where a problem lies in detecting a fault occurrence. Especially, even when all paths through a BEPK 160 have once been set disabled for use, which are very likely to be affected by a fault of an encryption/decryption module 1650, a subset of the paths through the BEPK 160 can be enabled for use if their proper operation can be verified by self-tests.

LIST OF REFERENCE SIGNS

10: Storage system
20: Host computer
100: Microprocessor package
160: Back-end package
161: Local router
165: Back-end interface
1650: Encryption/decryption module

The invention claimed is:

1. A storage system comprising:
a plurality of backend packages, wherein each of the plurality of packages include:
a plurality of backend communication interfaces that are each coupled to a respective storage drive from a plurality of storage drives, wherein each respective storage drive is communicatively coupled to at least two of the plurality of backend packages,
an encryption module that encrypts data written to the respective storage drive and decrypts data retrieved from the respective storage drive, and
a local processor that is communicatively coupled to the plurality of backend communication interfaces and the encryption module;
wherein the local processor of each respective backend package of the plurality of backend packages is configured to:
detect a fault in the respective backend package, and
determine where the fault occurred in the respective backend package,
on a condition that the fault is determined to have occurred in the encryption module of the respective backend package, disable the respective backend package, and
on a condition the fault is determined to have occurred along a particular communication path, disables a particular backend communication interface of the respective backend package associated with the particular path.

2. The storage system according to claim 1, further comprising:
a frontend package that includes a front end communication interface that is communicatively coupled to a host computer; and
a processor that is communicatively coupled to the frontend package and the plurality of backend packages,
wherein the processor is configured to:
receive, using the frontend package, a request from the host computer, wherein the request is to read or write data to a particular storage drive,
determine that a particular backend package associated with the particular storage drive is disabled,
transmit, using a different backend package, the request to the particular storage drive.

3. The storage system according to claim 2, further comprising:

a memory that stores relations among the plurality of backend packages, and the plurality of storage drives, wherein the memory further stores information that indicates whether each of the plurality of backend packages are disabled or enabled, and
wherein the processor is further configured to:
update the information in response to a backend package being disabled.

4. The storage system according to claim 3, wherein the local processor of each respective backend package of the plurality of backend packages is further configured to:
perform startup self-tests of the encryption module and the plurality of backend interfaces.

5. The storage system according to claim 4,
wherein on a condition that the startup self-tests of the encryption module and the plurality of backend interfaces are successful for a particular backend package, the information is updated to reflect that the particular backend package is enabled.

6. The storage system according to claim 5,
wherein the information is updated by the particular backend packager sending a notification to the processor.

7. A storage system comprising:
a plurality of storage drives;
a plurality of backend packages, wherein each of the plurality of packages include:
a plurality of backend communication interfaces that are each coupled to a respective storage drive from the plurality of storage drives, wherein each respective storage drive is communicatively coupled to at least two of the plurality of backend packages,
an encryption module that encrypts data written to the respective storage drive and decrypts data retrieved from the respective storage drive, and
a local processor that is communicatively coupled to the plurality of backend communication interfaces and the encryption module; and
a controller that is communicatively coupled to the plurality of backend packages, wherein the controller includes:
a memory that stores relations among the plurality of backend packages, and the plurality of storage drives, wherein the memory further stores information that indicates whether each of the plurality of backend packages are disabled or enabled; and
a controller processor communicatively coupled to the memory that is configured to update the information;
wherein the local processor of each respective backend package of the plurality of backend packages is configured to:
detect a fault in the respective backend package, and
determine where the fault occurred in the respective backend package,
on a condition that the fault is determined to have occurred in the encryption module of the respective backend package, disable the respective backend package, and
on a condition the fault is determined to have occurred along a particular communication path, disables a particular backend communication interface of the respective backend package associated with the particular path.

8. The storage system according to claim 7,
wherein the local processor of each respective backend package of the plurality of backend packages is further configured to:

perform startup self-tests of the encryption module and the plurality of backend interfaces.

9. The storage system according to claim 8, wherein on a condition that the startup self-tests of the encryption module and the plurality of backend interfaces are successful for a particular backend package, the information is updated to reflect that the particular backend package is enabled.

* * * * *